United States Patent
Falk (10) Patent No.: US 10,659,187 B2
(45) Date of Patent: May 19, 2020

(54) SECURELY PROVIDING A RECEIVER UNIT WITH A REPLICA PSEUDO-RANDOM NOISE CODE

(71) Applicant: Rainer Falk, Poing (DE)

(72) Inventor: Rainer Falk, Poing (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/752,936

(22) Filed: Jun. 27, 2015

(65) Prior Publication Data

US 2015/0381308 A1 Dec. 31, 2015

(30) Foreign Application Priority Data

Jun. 27, 2014 (DE) .................. 10 2014 212 488

(51) Int. Cl.
| | | |
|---|---|---|
| *H04K 1/02* | (2006.01) | |
| *G01S 19/21* | (2010.01) | |
| *G01S 19/37* | (2010.01) | |
| *H04L 9/00* | (2006.01) | |
| *G01S 19/13* | (2010.01) | |
| *G06F 21/60* | (2013.01) | |

(52) U.S. Cl.
CPC .............. *H04K 1/02* (2013.01); *G01S 19/13* (2013.01); *G01S 19/21* (2013.01); *G01S 19/215* (2013.01); *G01S 19/37* (2013.01); *G06F 21/606* (2013.01); *H04L 9/002* (2013.01)

(58) Field of Classification Search
None
See application file for complete search history.

(56) References Cited

U.S. PATENT DOCUMENTS

| | | | | |
|---|---|---|---|---|
| 4,341,925 A | * | 7/1982 | Frosch ................. | H04L 9/0662 331/78 |
| 4,678,987 A | * | 7/1987 | Bauck ................... | H03L 7/23 324/76.12 |
| 4,893,339 A | * | 1/1990 | Bright .................. | H04K 1/02 380/269 |
| 4,993,067 A | * | 2/1991 | Leopold ............... | H04L 9/0891 340/5.74 |
| 5,081,462 A | * | 1/1992 | Tachita ................. | G01S 19/30 342/352 |

(Continued)

FOREIGN PATENT DOCUMENTS

| | | |
|---|---|---|
| CN | 101359044 A | 2/2009 |
| CN | 102844678 A | 12/2012 |

(Continued)

OTHER PUBLICATIONS

Hudde (Hans Christoph Hudde, Building Stream Ciphers from Block Ciphers and their Security, Bochum Ruhr University, Feb. 2009).*

(Continued)

*Primary Examiner* — Piotr Poltorak
(74) *Attorney, Agent, or Firm* — Lempia Summerfield Katz LLC (57) ABSTRACT

A method for securely providing a receiver unit with a replica pseudo-random noise code is provided. The replica pseudo-random noise code is provided in a restricted manner based on a result of an admissibility check. In order to carry out the admissibility check, values are recorded and are compared with predefined threshold values.

19 Claims, 3 Drawing Sheets

(56) References Cited

U.S. PATENT DOCUMENTS

| | | | |
|---|---|---|---|
| 5,365,447 A | 11/1994 | Dennis | |
| 5,384,848 A * | 1/1995 | Kikuchi | H04L 9/12 380/262 |
| 5,412,730 A * | 5/1995 | Jones | H04L 9/12 380/262 |
| 5,640,452 A * | 6/1997 | Murphy | H04N 7/165 342/357.31 |
| 5,754,657 A * | 5/1998 | Schipper | G01S 19/16 342/357.29 |
| 5,982,809 A * | 11/1999 | Liu | H04B 1/707 375/147 |
| 6,055,314 A * | 4/2000 | Spies | G06Q 20/123 348/E7.056 |
| 6,101,605 A * | 8/2000 | Buer | H04L 9/0894 713/189 |
| 6,408,019 B1 * | 6/2002 | Pickering | H04K 1/02 375/130 |
| 6,430,170 B1 * | 8/2002 | Saints | G06F 7/588 370/206 |
| 7,643,637 B2 * | 1/2010 | Venkatesan | H04L 1/0057 375/245 |
| 7,949,038 B2 * | 5/2011 | Avellone | G01S 19/30 342/352 |
| 8,438,392 B2 * | 5/2013 | Oxford | G06F 21/10 713/168 |
| 8,472,627 B2 * | 6/2013 | Denning | H04L 63/0428 380/258 |
| 8,855,303 B1 * | 10/2014 | Glatfelter | H04L 9/0861 380/277 |
| 2002/0023010 A1 * | 2/2002 | Rittmaster | G06F 16/9537 705/26.1 |
| 2002/0085716 A1 * | 7/2002 | Abdulkader | H04K 1/02 380/205 |
| 2002/0136407 A1 * | 9/2002 | Denning | G06F 21/10 380/258 |
| 2003/0142821 A1 * | 7/2003 | Ross | H04L 9/12 380/46 |
| 2003/0172268 A1 * | 9/2003 | Walmsley | H04L 9/3271 713/168 |
| 2003/0179089 A1 * | 9/2003 | Sweatt | G08B 27/00 340/539.1 |
| 2003/0223579 A1 * | 12/2003 | Kanter | H04L 9/304 380/28 |
| 2004/0203461 A1 * | 10/2004 | Hay | G01S 19/21 455/67.13 |
| 2005/0122951 A1 * | 6/2005 | Kuehnle | G04R 20/10 370/345 |
| 2005/0149745 A1 * | 7/2005 | Ishidoshiro | G06F 21/602 713/189 |
| 2005/0152538 A1 * | 7/2005 | Stedron | G09C 1/02 380/28 |
| 2005/0201552 A1 * | 9/2005 | Arisawa | G06F 21/75 380/28 |
| 2006/0101524 A1 * | 5/2006 | Weber | H04L 63/0428 726/27 |
| 2007/0016794 A1 * | 1/2007 | Harrison | H04L 9/0656 713/182 |
| 2007/0074276 A1 * | 3/2007 | Harrison | H04L 9/0656 726/4 |
| 2007/0101410 A1 * | 5/2007 | Harrison | H04L 9/0656 726/4 |
| 2008/0025511 A1 * | 1/2008 | Fuse | H04K 1/02 380/256 |
| 2008/0055109 A1 * | 3/2008 | Freathy | G07C 9/00111 340/8.1 |
| 2008/0100509 A1 * | 5/2008 | Kimura | G01S 19/24 342/357.63 |
| 2008/0246656 A1 * | 10/2008 | Ghazarian | G08B 25/016 342/357.54 |
| 2009/0061835 A1 * | 3/2009 | Schmidt | H04W 4/023 455/414.2 |
| 2009/0103733 A1 * | 4/2009 | Falk | H04L 63/061 380/277 |
| 2009/0257471 A1 * | 10/2009 | Tanaka | G01S 19/13 375/130 |
| 2010/0029233 A1 * | 2/2010 | Chu | H04H 20/22 455/186.1 |
| 2010/0278335 A1 | 11/2010 | Enge et al. | |
| 2011/0254734 A1 | 10/2011 | Li et al. | |
| 2012/0300925 A1 * | 11/2012 | Zaverucha | H04L 51/00 380/46 |
| 2013/0311791 A1 * | 11/2013 | Falk | G06F 21/55 713/194 |
| 2014/0195576 A1 * | 7/2014 | Kaplan | G06F 7/588 708/250 |
| 2014/0232597 A1 | 8/2014 | Hyun | |
| 2017/0031028 A1 * | 2/2017 | Fernandez Hernandez | H04L 9/3242 |

FOREIGN PATENT DOCUMENTS

| | | |
|---|---|---|
| CN | 103869337 A | 6/2014 |
| DE | 102011075434 B4 | 10/2013 |
| EP | 2746810 A1 | 6/2014 |
| WO | WO2011027191 A1 | 10/2011 |

OTHER PUBLICATIONS

Menezes et al. (Alfred J. Menezes, Paul C. van Oorschot, Scott A. Vanstone, "Handbook of applied cryptography", 1997, ISBN: 0849385237).*

European Search Report for related European Application No. 15160841.1, dated Nov. 3, 2015, with English Translation.

German Office Action for German Application No. 10 2014 212 488.3, dated Dec. 11, 2014, with English Translation.

Chinese Office Action for Chinese Application No. 201510360376.8 dated May 31, 2018.

* cited by examiner

SECURELY PROVIDING A RECEIVER UNIT WITH A REPLICA PSEUDO-RANDOM NOISE CODE

This application claims the benefit of DE 10 2014 212 488.3, filed on Jun. 27, 2014, which is hereby incorporated by reference in its entirety.

BACKGROUND

The present embodiments relate to securely providing a receiver unit with a replica pseudo-random noise code.

Pseudo-random code sequences (e.g., pseudo-random noise codes or pseudo-random number codes (PRNC or PRN codes for short)) are used during radio transmission, for example. These are spreading codes that spread the frequency of a message signal. As a result of the broadband transmission, such a signal has a high degree of robustness to interference. Spreading sequences are used, for example, in satellite navigation systems such as GPS, Glonass, Beidou or Galileo. In this case, the emitted satellite signal is below a noise level. A receiver may decode the emitted signal only by correlation with an appropriate PRN code that is available to the receiver. This may be the identical PRN code that may already be present in the receiver, for example. It is also possible to refer to a replica PRN code that is a reconstructed or simulated PRN code or a PRN code in the form of a second embodiment.

It is known practice to use cryptographic PRN codes. In this case, the code sequence is dependent on a cryptographic key. A receiver may generate the appropriate PRN code for decoding the reception signal only if the receiver knows the PRN code used by the transmitter to emit the signal. The receiver requires the cryptographic key for this purpose.

In this case, the receiver (e.g., the signal processing in the receiver) may be protected from attackers in a complicated manner using security mechanisms. For example, an FPGA in which the cryptographic signals are processed are to be expensively protected using emission protection or tamper protection.

It is generally known practice to digitize and record raw data of a received GPS signal. The raw data is transmitted to a cloud service, with the result that the signal processing is implemented on a server. In this case, the server may be specially protected, with the result that the cryptographic signal processing that is critical to security is carried out in a secure computing center. However, a large proportion of the server environment, including data transmission paths used, is again to be protected in a complicated manner.

The intention is for it to be as difficult as possible for an attacker to gain possession of a PRN code that is generated and provided at the receiver end. This is also intended to be provided for the situation in which the attacker may access a receiver and attempts to manipulate the receiver.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and a provision unit that make the use of a replica pseudo-random noise code secure at the receiver end are provided.

One or more of the present embodiments relate to a method for securely providing a receiver unit with a replica pseudo-random noise code. The replica pseudo-random noise code is provided in a restricted manner based on a result of an admissibility check. In order to carry out the admissibility check, values are recorded and are compared with predefined threshold values.

In the present application, a replica pseudo-random noise code may be a code sequence that is used in a correlation method at the receiver end in order to be able to decode a reception signal from a transmitter. The transmitter uses a pseudo-random noise code associated with the replica pseudo-random noise code to modulate the signal. A replica pseudo-random noise code therefore forms, together with a pseudo-random noise code, a pair that is to match and is to be identical (e.g., in terms of the bit string of the code), so that the pseudo-random noise code of the reception signal may be decoded at the receiver end. In the case of a cryptographically generated pseudo-random noise code used by the transmitter, the appropriate (e.g., identical) symmetrical key is to also be available at the receiver end so that the appropriate replica pseudo-random noise code may be generated.

Therefore, the generation of the replica pseudo-random noise code that is needed by the receiver to decode the reception signal is enabled only if the result of the admissibility check indicates that the provision does not constitute a security risk. In this case, the admissibility check is subdivided into at least two sections: values are recorded, and the recorded values are compared with predefined threshold values. A check is therefore carried out at the receiver end. The check may take into account properties of the reception signal, the receiver, or the environment during the admissibility check. The result of the admissibility check may involve outputting or not outputting a replica pseudo-random noise code or, in the latter case, outputting a warning that states that the admissibility check was not passed.

In this case, the replica pseudo-random noise code may be explicitly provided as a bit string or as a sequence of bytes or words of a word width (e.g., 16, 32, 64, 128, 256 bits). The replica pseudo-random noise code may also be provided in an archive file format (e.g., in the format tar, zip or rar).

In one embodiment, information may be provided for generating a replica pseudo-random noise code. For example, for a known implementation of a replica pseudo-random noise code generator that uses an item of internal state information in the form of a data structure, a state data structure is provided as the replica pseudo-random noise codes. This state data structure may include, for example, a cryptographic key and a counter value in obfuscated or encrypted form. An item of information for admissibly using an item of internal state information may be included (e.g., a length specification of a code that may be generated). This provides that, in these variants, instead of the actual replica pseudo-random noise code in the form of a bit string, an item of auxiliary information is provided as the replica pseudo-random noise code. The item of auxiliary information makes it possible to determine the code section as a bit string or as a replica pseudo-random noise signal.

The reception signal may be, for example, a data transmission signal or a satellite signal. The common feature of the signals is, for example, that the signals are used for a service that emits signals using PRN codes.

A receiver that has been compromised and is intended to be misused by the attacker may receive or use a service protected with pseudo-random noise codes or cryptographic pseudo-random noise codes only to a limited extent. The complicated installation of a security module or complicated security protection of subassemblies of the receiver may be reduced and may be restricted, for example, to the provision unit. A receiver for using a service protected using pseudo-random noise codes may therefore be produced in a more favorable manner, and reception signals may nevertheless be decoded only in the case of a positive result of the admissibility check. Only the area in which a cryptographic replica pseudo-random noise code is intended to be generated from a cryptographic key with the aid of a replica pseudo-random noise code generator is advantageously protected, rather than an entire signal processing unit of the receiver, using security mechanisms. The admissibility check is also implemented in the area. The admissibility check may be carried out in an area protected by security mechanisms. As a result, it is provided that the replica pseudo-random noise code is available in an accessible manner in the receiver and may be processed, for example, by a signal processing unit only as soon as the admissibility check has been carried out in a non-manipulated manner and has provided a positive result.

According to one embodiment, a correlation with a reception signal is carried out using the replica pseudo-random noise code.

In this case, a reception signal that may be received by the receiver unit is correlated during signal processing (e.g., in a continuous manner). Sections in which a signal (e.g., a data transmission signal or a satellite signal) is detected by the correlation and in which a result of the correlation involves the receiver not detecting a signal emitted by a transmitter may therefore alternate.

According to one embodiment, a pseudo-random noise code contained in a reception signal received by the receiver unit may be decoded using a correlation method with the aid of the replica pseudo-random noise code. The reception signal has, for example, only one pseudo-random noise component.

According to one embodiment, a pseudo-random noise signal contained in a reception signal received by the receiver unit is evaluated using a correlation method.

In this case, a time offset between the reception signal containing the pseudo-random noise signal and the replica pseudo-random noise signal generated at the receiver end may be determined, for example. For example, the reception signal is a satellite signal. In one embodiment, time information, position information, or distance information (e.g., if a plurality of satellite signals are received by the receiver unit) may be determined, for example.

According to one embodiment, a pseudo-random noise signal is received by the receiver unit as part of a reception signal (e.g., a satellite navigation signal).

The evaluation of the reception signal by correlation with the replica pseudo-random noise signal may be used in each case to determine a time offset from which a pseudo-range or an item of position/velocity/time information may be derived depending on the number of satellite signals that may be received and depending on the result of the admissibility check.

According to one embodiment, in order to carry out the admissibility check, a satellite identifier of the reception signal is recorded.

The satellite identifier or space vehicle identifier indicates the transmitter from which the reception signal originates. The admissibility check may advantageously give a positive result only for selected satellite identifiers. In this case, the selection of the selected satellite identifiers may be fixed or may be temporally variable (e.g., based on an expected constellation of satellites). Only a limited maximum number of satellite identifiers for a receiver may achieve a positive result of the admissibility check. For example, the reception signal is intended to be able to be decoded only for a maximum of one or a maximum of two satellites for each receiver. In one embodiment, reception signals from a limited number of different satellites may be intended to be able to be decoded for a predefined period (e.g., for a maximum of two satellites each hour).

In this case, the selected restrictions may be fixed in one variant (e.g., may not be changed for a receiver).

In one variant, replica pseudo-random noise codes may be generated only, for example, stipulated satellite navigation systems.

According to one embodiment, in order to carry out the admissibility check, a frequency band of the reception signal is recorded. For example, the reception signal may be decoded only for particular frequency bands (e.g., E1 or E6). For this purpose, a provision unit that carries out the admissibility check is provided with the value for the frequency band by the signal processing unit. The provision unit provides the replica pseudo-random noise code, and the signal processing may carry out the correlation in order to decode the reception signal only if the frequency band is admissible.

According to one embodiment, in order to carry out the admissibility check, an item of information relating to satellite orbit data is acquired. For example, almanac information is evaluated. In this case, it is detected if a replica pseudo-random noise code is intended to be generated. The replica pseudo-random noise code is intended to be generated for the purpose of decoding a reception signal from a satellite that is unexpected on account of the current position of the receiver. For example, the almanac data may be used to stipulate the satellites visible for a time to the receiver based on the position, and an appropriate replica pseudo-random noise code may be generated only for these satellites.

According to one embodiment, in order to carry out the admissibility check, a time value is recorded. This provides that, for example, a replica pseudo-random noise code may be provided only at predefinable intervals of time (e.g., only every 10 s or every 60 s or every 3600 s). This provides that, for example, highly dynamic navigation with the receiver is not possible. This may be advantageous if the receiver is intended to be oriented for less accurate navigation and is not intended to be misused by an attacker.

Combined recording of various values of the abovementioned values is also possible. For example, it is possible to stipulate that, in the event of a request for a replica pseudo-random noise code for a particular satellite for a particular time period, a replica pseudo-random noise code may be requested for another satellite only when the stipulated time period has already elapsed for a predefinable duration. The time periods of the replica pseudo-random noise code of two different satellites may not overlap or may have a minimum interval of time. It is also possible to stipulate that, although a replica pseudo-random noise code may be requested for any desired satellite, the replica pseudo-random noise code may not be requested for any desired number of different satellites at the same time. For example, a replica pseudo-random noise code may be requested and generated at the receiver end only for one satellite or for two satellites. Therefore, only an item of time information relating to the service protected using pseudo-random noise code may be determined, for example, but no PVT determination for determining a position, velocity and time may be carried out. At least three different satellite signals are required for this purpose if there is a local highly accurate real-time clock, or four different satellite signals. The use of the receiver is therefore restricted by the range of functionalities carried out by the receiver. An attacker is therefore restricted to the functions provided for the receiver.

According to one embodiment, in order to carry out the admissibility check, an acceleration value or a position value of the receiving unit is recorded using a sensor. The receiver unit or an integrated security module may have, for example, an acceleration sensor or a height sensor in order to record an acceleration or height. The replica pseudo-random noise code is provided, for example, only when there is no acceleration above a threshold value or no height above a maximum limit. This also makes it possible to restrict undesirable use of the receiver. Geostationary receivers that have fallen down from a position or have been dismantled and have possibly been manipulated, for example, detect a possible attack using the installed sensors. In such a case, the method of operation of the receiver may be completely restricted by stopping the replica pseudo-random noise code generation. As a result, the receiver becomes unusable for the reception of pseudo-random noise signals.

According to one embodiment, in order to carry out the admissibility check, a history of replica pseudo-random noise codes provided temporally before carrying out the check is checked. A memory unit is provided for the purpose of storing replica pseudo-random noise signals that have already been requested and/or output.

One or more of the present embodiments also relate to a provision unit for securely providing a receiver unit with a replica pseudo-random noise code. The provision unit includes an admissibility checking unit for providing the replica pseudo-random noise code in a restricted manner based on a result of an admissibility check, in order to carry out the admissibility check. Values may be recorded and may be compared with predefined threshold values.

According to one embodiment, the provision unit also includes a replica pseudo-random noise code generator for generating the replica pseudo-random noise code. Alternatively, the replica pseudo-random noise code generator is externally implemented.

According to one embodiment, the provision unit also includes a key generator or a key memory for generating a cryptographic key. A cryptographic replica pseudo-random noise code may be generated using the cryptographic key. According to one embodiment, the provision unit is formed on a receiver with a receiver unit. In one embodiment, a stored cryptographic key of the provision unit is deleted by the provision unit if the result of an admissibility check reveals inadmissible use of the provision unit.

According to one embodiment, tamper protection is provided for the provision unit for the purpose of detecting manipulation or damage. The tamper protection may be a security module. The security module includes the replica pseudo-random noise code generator and at least the admissibility checking unit. The key generator or key memory may also be implemented on the security module.

DETAILED DESCRIPTION

Figure 1:
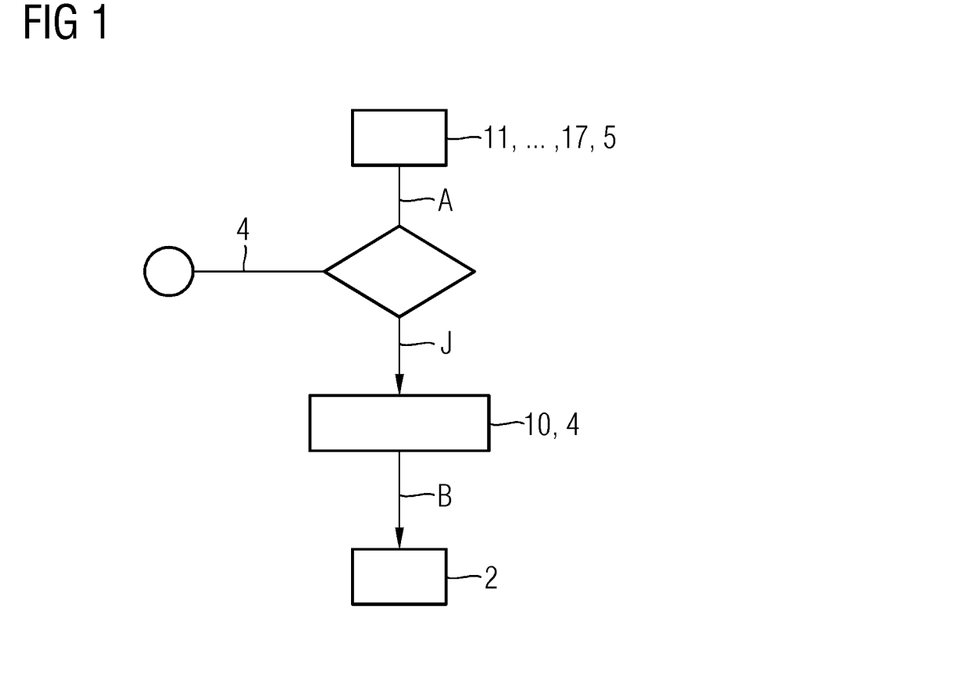
FIG. 1 shows a schematic illustration of one embodiment of a method for securely providing a receiver unit with a replica pseudo-random noise code.

FIG. 1 schematically shows how an admissibility check is carried out A with the aid of values 11, . . . , 17. In this case, the carrying-out A of the admissibility check leads to a result Y, N. The replica pseudo-random noise code 10 is not provided in the event of a negative result N. An alarm signal indicating that the admissibility check has not been passed is output for this case, for example. For the case of a positive result Y, the replica pseudo-random noise code 10 is generated, for example, by a replica pseudo-random noise code generator 4, and a receiver unit 2 is provided B with the code.

Figure 2:
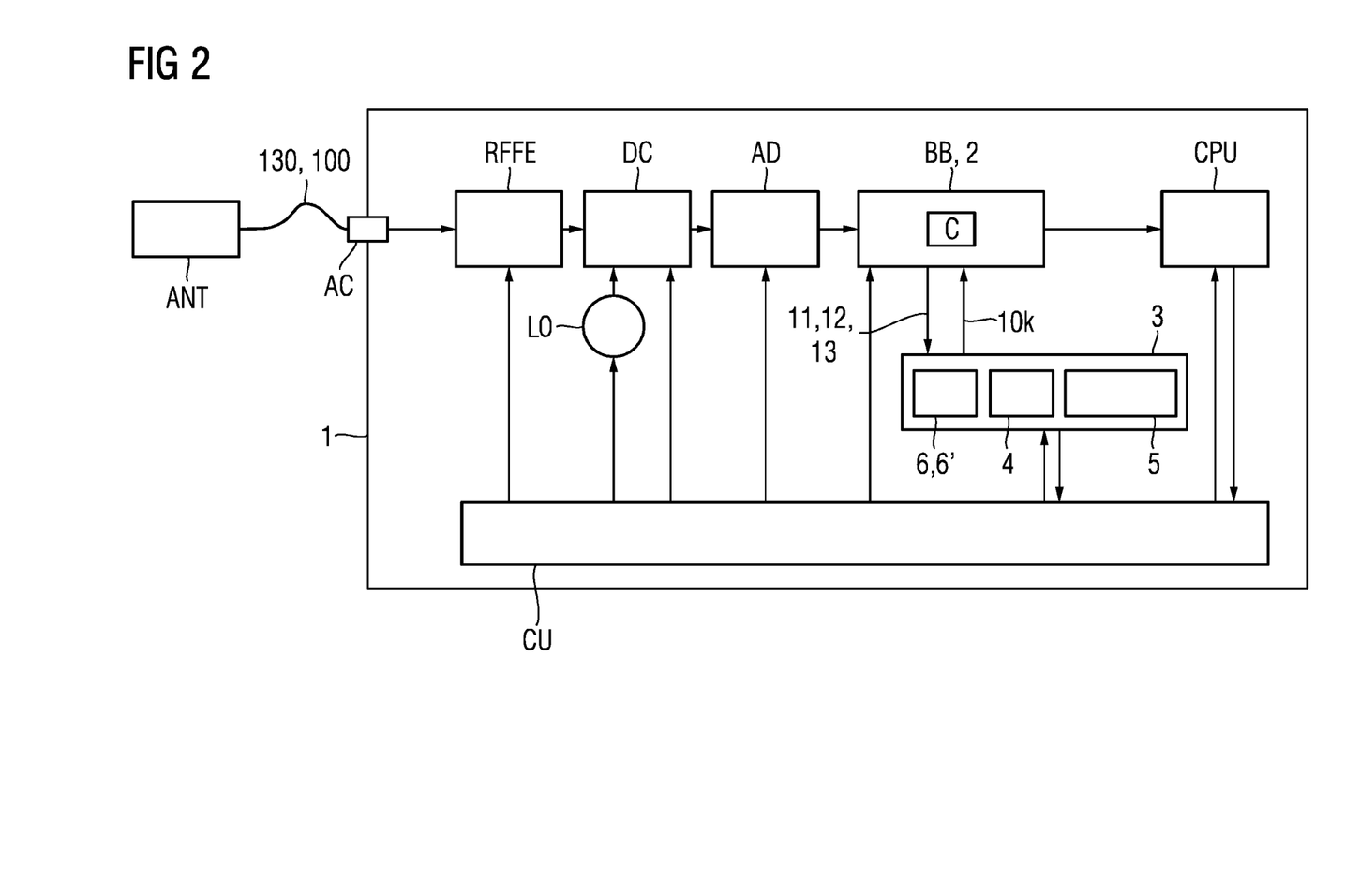
FIG. 2 shows a schematic illustration of a receiver having a provision unit for securely providing a replica pseudo-random noise code according to a first exemplary embodiment.

FIG. 2 schematically illustrates how a receiver 1 with an integrated provision unit 3 is set up according to a first exemplary embodiment. The receiver 1 includes an antenna socket AC that may be used to connect an antenna ANT. A reception signal 130 provided by the antenna ANT is processed by a radio-frequency subassembly RFFE (e.g., the radio-frequency front end). Filtering and amplification are carried out in this case. The signal is then made available to a down converter DC that mixes the signal with a signal from a local oscillator LO and therefore carries out down conversion. The signal is then made available to an analog/digital converter AD. The analog/digital converter AD forwards the digitized signal to the baseband processing BB. In this case, the receiver is controlled by a controller CU or control unit. The controller CU or control unit configures the individual subassemblies (e.g., in order to choose an appropriate frequency band by changing the frequency of the local oscillator LO, in order to configure the input filter of the radio-frequency subassembly RFFE, in order to configure the bandwidth or sampling rate of the analog/digital converter AD, or in order to choose a modulation method for the baseband processing BB).

The baseband processing BB may be implemented in a field programmable gate array (FPGA) module. The baseband processing BB is provided with a cryptographic replica pseudo-random noise code 10K by a provision unit 3. The baseband processing unit is in the form of a receiver unit 2 of the receiver for correlating the reception signal with the cryptographic replica pseudo-random noise code 10K.

The provision unit 3 includes a replica pseudo-random noise code generator 4. A key generator 6 or a key memory 6' is also provided for the purpose of generating or storing a cryptographic key K. The replica pseudo-random noise code generator 4 is configured to generate a cryptographic replica pseudo-random noise code 10K and selects a suitable cryptographic key K (e.g., depending on the area of application or depending on the location at which the receiver 1 is situated or depending on the time at which signal processing is intended to be carried out). For example, a plurality of keys, from which a specific replica pseudo-random code is respectively generated, may be provided. For example, different keys are provided for different satellite systems.

Values that identify the satellite signal (e.g., the satellite identifier 11, the frequency band 12, or satellite orbit data 13) are evaluated by the baseband processing BB and are made available to the provision unit 3. An admissibility checking unit 5 takes these values into account when carrying out the admissibility check and determines a positive result only when the values indicate harmless use of the replica pseudo-random noise code 13 in comparison with threshold values. In this case, harmless may be, for example, the fact that the admissibility checking unit 5 expects the decoding of a reception signal characterized based on the values (e.g., based on an expected position of the receiver or the respective transmitting satellite). The provision unit 3 is in the form of a security module and is installed in a manner physically protected against attacks. For example, the security module is protected by being molded in epoxy resin or by introducing a drill protection film. Lines that lead away from the security module are filtered in order to provide that no critical signals reach the outside.

The provision unit 3 includes a key generator 6 or a key memory 6' for providing the cryptographic key, the replica pseudo-random noise code generator for providing the cryptographic replica pseudo-random noise code, and the admissibility checking unit 5 that restricts the provision of the replica pseudo-random noise code and the cryptographic replica pseudo-random noise code. In this case, it is sufficient, for example, to protect only these subassemblies inside the provision unit using the security module. This makes it possible to create a favorable receiver in which the entire signal processing of the receiver does not need to be protected using tamper protection measures.

The cryptographic replica pseudo-random noise code 10K is transmitted from the provision unit 3 to the receiver unit 2, which may constitute the baseband processing BB, for example, only if the result of the admissibility check is positive. In the receiver unit, the cryptographic replica pseudo-random noise code 10K is transferred to a correlator C for correlation with the reception signal 130. The correlator C decodes a pseudo-random noise code 100 contained in the reception signal 130. A signal decoded in this manner may be transferred by the baseband processing BB to a central processor unit CPU, which, in order to evaluate the reception signal 130, carries out the acts that are possible based on the cryptographic replica pseudo-random noise code 10K provided. For example, only two different replica pseudo-random noise codes are provided by the provision unit 3, and only two signal components that are received in the reception signal 130 and come from two different satellites may therefore each be decoded by the baseband processing BB. Accordingly, the processor unit CPU may determine a respective time offset for the two satellite signals and may derive an item of time information from the time offset.

Figure 3:
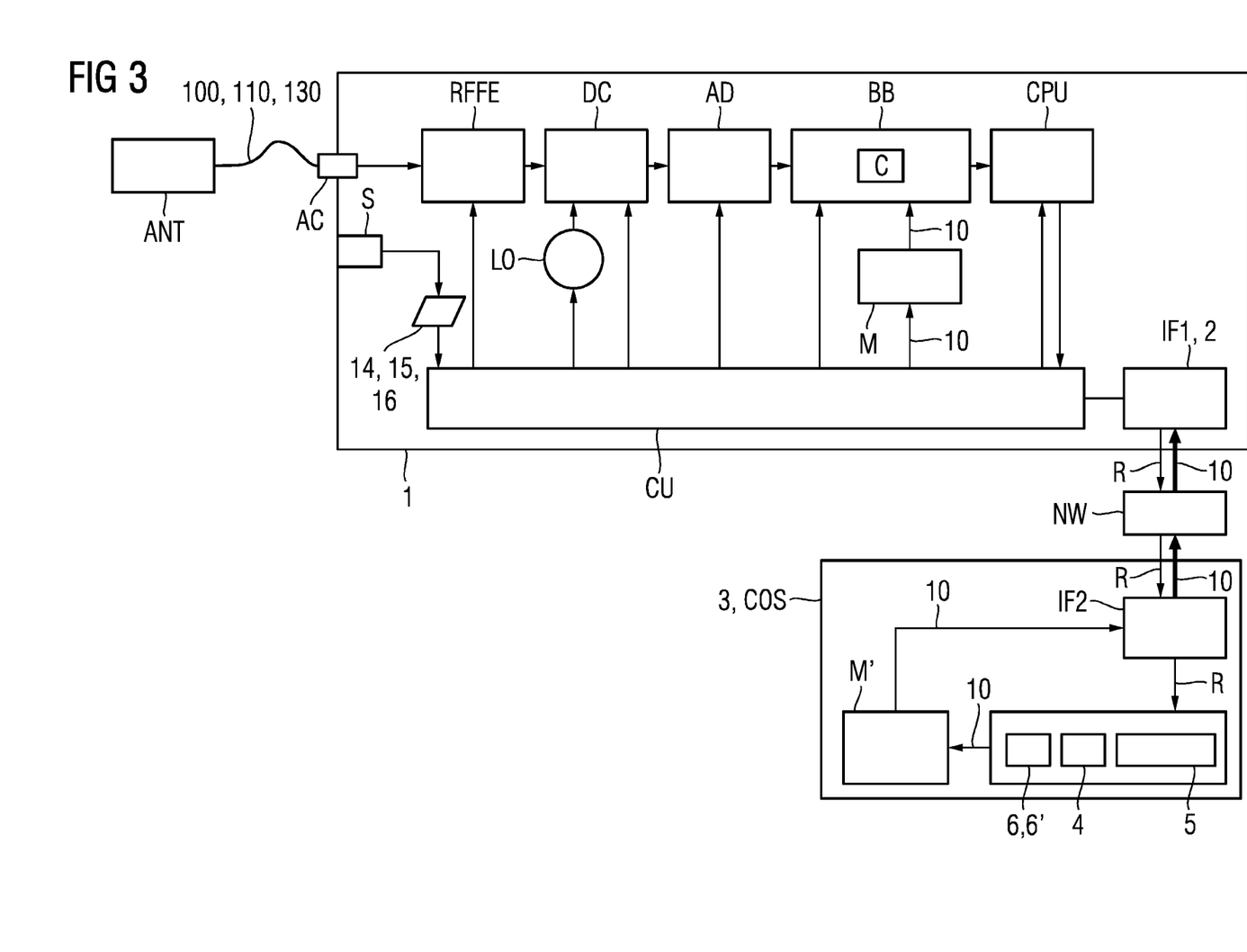
FIG. 3 shows a schematic illustration of a receiver having a provision unit for securely providing a replica pseudo-random noise code according to a second exemplary embodiment.

FIG. 3 shows a second exemplary embodiment in which the receiver is implemented in a distributed manner. Functionally same elements are provided with the same reference symbols in FIGS. 2 and 3 unless indicated otherwise.

FIG. 3 shows the schematic structure of a receiver 1 when using a cloud offload server COS or snippet server. The admissibility check is therefore carried out outside the receiver 1, and the cloud offload server COS or snippet server is used as the provision unit 3. A request R is sent to the provision unit 3 using a first network interface IF1 of the receiver 1 via a network NW. An item of identification information that relates to the receiver 1 and is transmitted using the request R may be included in the admissibility check. The server may therefore advantageously allow requests from other receivers to be concomitantly included in the decision. Restrictions for a group of receivers, for example, may be stipulated based on requests made within the group and may be enforced.

Values that indicate, for example, a time value 14, an acceleration value 15, or a position value 16 of the receiving unit 2 may also be transferred to the admissibility checking unit 5 with the request R. The receiving unit 1 may have a sensor S for this purpose. If the admissibility check gives a positive result, the cryptographic replica pseudo-random noise code 10K is stored as a snippet (e.g., as a restricted signal section) in a memory area M'. For example, this is a digitized signal excerpt that is made available to the network via a second network interface IF2 of the cloud offload server COS and is therefore made available to the receiver 1 via the first network interface IF1. The snippet server may be set up as a provision unit 3 in a secure environment, with the result that the receiver unit 2, which is the first network interface IF1 in this example, is provided with the cryptographic replica pseudo-random noise code 10K by the provision unit 3 in a secure manner via the network NW.

In one embodiment, communication inside the network is additionally protected in order to provide the integrity of the request R and of the cryptographic replica pseudo-random noise code 10K.

The cryptographic replica pseudo-random noise code 10K is stored in a code memory M of the receiver 1 provided for this purpose. The correlator C for carrying out the correlation may read the cryptographic pseudo-random noise code 10K from this code memory M and may decode a reception signal 130 that has a matching pseudo-random noise code 100 in the pseudo-random noise signal 110. The result of the correlation is forwarded to the central processor unit CPU in order to determine a time offset.

In another embodiment, the provision unit is supplemented with the admissibility checking unit, with the result that the replica pseudo-random noise code is provided only in a restricted manner, even for the case in which the entire baseband processing is carried out in an outsourced manner on a cloud offload server or a snippet processor. For this variant, the admissibility check is used for increased security inside the snippet processor. A receiver that has been compromised may then request signal processing from the server only to a limited extent despite an existing communication connection since this server carries out the signal processing and, for example, the correlation of a reception signal with the replica pseudo-random noise code only in the event of a positive result of the admissibility check.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for securely providing a receiver unit with a replica pseudo-random noise code, the method comprising:
   receiving, by the receiver unit, a reception signal, the reception signal including a pseudo-random noise code;

generating, by a security module of the receiver unit, the
replica pseudo-random noise code;
carrying out, by the security module of the receiver unit,
an admissibility check based on one or more characteristics of the reception signal, the carrying out of the
admissibility check comprising recording and comparing values of the reception signal with predefined
threshold values, the security module of the receiver
unit providing tamper protection against manipulation
or damage to the generated replica pseudo-random
noise code;
when the admissibility check returns a positive result,
providing the generated replica pseudo-random noise
code to a part of the receiver unit outside of the security
module in a restricted manner, the replica pseudo-random noise code only being accessible by the part of
the receiver unit when the admissibility check returns
the positive result; and
decoding the pseudo-random noise code included in the
received reception signal using a correlation method
with the aid of the replica pseudo-random noise code
generated and provided by the security module of the
receiver unit,
wherein carrying out the admissibility check comprises:
recording a satellite identifier of the reception signal,
the satellite identifier of the reception signal being a
characteristic of the one or more characteristics of
the reception signal;
recording a frequency band of the reception signal, the
frequency band of the reception signal being a characteristic of the one or more characteristics of the
reception signal;
acquiring an item of information relating to satellite
orbit data, the item of information relating to satellite
orbit data being a characteristic of the one or more
characteristics of the reception signal;
recording a time value, the time value being a characteristic of the one or more characteristics of the
reception signal;
recording an acceleration value or a position value of
the receiving unit using a sensor;
checking a history of replica pseudo-random noise
codes provided temporally before carrying out the
check; or
any combination thereof.

2. The method of claim 1, further comprising carrying out
a correlation with the reception signal using the replica
pseudo-random noise code.

3. The method of claim 1, further comprising evaluating
a pseudo-random noise signal contained in the reception
signal received by the receiver unit using a correlation
method.

4. The method of claim 1, wherein a pseudo-random noise
signal is received by the receiver unit as part of the reception
signal.

5. The method of claim 4, wherein the reception signal is
a satellite navigation signal.

6. The method of claim 1, wherein carrying out the
admissibility check comprises recording a satellite identifier
of the reception signal, the satellite identifier of the reception
signal being a characteristic of the one or more characteristics of the reception signal.

7. The method of claim 1, wherein carrying out the
admissibility check comprises recording a frequency band of
the reception signal, the frequency band of the reception
signal being a characteristic of the one or more characteristics of the reception signal.

8. The method of claim 1, wherein carrying out the
admissibility check comprises acquiring an item of information relating to satellite orbit data, the item of information
relating to satellite orbit data being a characteristic of the one
or more characteristics of the reception signal.

9. The method of claim 1, wherein carrying out the
admissibility check comprises recording a time value, the
time value being a characteristic of the one or more characteristics of the reception signal.

10. The method of claim 1, wherein carrying out the
admissibility check comprises recording an acceleration
value or a position value of the receiving unit using a sensor.

11. The method of claim 1, wherein carrying out the
admissibility check comprises checking a history of replica
pseudo-random noise codes provided temporally before
carrying out the check.

12. A provision unit for securely providing a receiver unit
with a replica pseudo-random noise code after receiving, by
the receiver unit, a reception signal containing a pseudo-random noise code, the provision unit comprising:
an admissibility checking unit of a security module of the
receiver unit, the admissibility checking unit being
configured to generate the replica pseudo-random noise
code, carry out an admissibility check based on one or
more characteristics of the reception signal, and provide the generated replica pseudo-random noise code to
part of the receiver unit outside of the security module
in a restricted manner when the admissibility check
returns a positive result, the replica pseudo-random
noise code only being accessible by the part of the
receiver unit when the admissibility check returns the
positive result, the admissibility check comprising
recordation and comparison of values of the reception
signal with predefined threshold values,
wherein the admissibility checking unit, in order to carry
out the admissibility check, is further configured to:
record a satellite identifier of the reception signal, the
satellite identifier of the reception signal being a
characteristic of the one or more characteristics of
the reception signal;
record a frequency band of the reception signal, the
frequency band of the reception signal being a characteristic of the one or more characteristics of the
reception signal;
acquire an item of information relating to satellite orbit
data, the item of information relating to satellite orbit
data being a characteristic of the one or more characteristics of the reception signal;
record a time value, the time value being a characteristic of the one or more characteristics of the reception signal;
record an acceleration value or a position value of the
receiver unit using a sensor;
check a history of replica pseudo-random noise codes
provided temporally before carrying out the check;
or
any combination thereof.

13. The provision unit of claim 12, wherein the replica
pseudo-random noise code is generated by a replica pseudo-random noise code generator of the provision unit or an
external replica pseudo-random noise code generator connectable to the provision unit.

14. The provision unit of claim 12, further comprising a
key generator or a key memory configured to generate a
cryptographic key,
wherein a cryptographic replica pseudorandom noise
code is generated using the cryptographic key.

15. The provision unit of claim 12, wherein the provision unit is formed on a receiver with a receiver unit.

16. The provision unit of claim 15, wherein tamper protection is provided for the provision unit to detect manipulation or damage.

17. The method of claim 1, wherein decoding the pseudo-random noise code included in the received reception signal comprises decoding, by the part of the receiver unit outside of the security module, the pseudo-random noise code included in the received reception signal.

18. The method of claim 1, wherein the replica pseudo-random noise code is generated when the admissibility check returns the positive result.

19. The method of claim 1, wherein the tamper protection of the security module includes an epoxy resin mold or drill protection film that physically protects the security module.

* * * * *